Fig.1

Patented Oct. 7, 1947

2,428,457

UNITED STATES PATENT OFFICE 2,428,457

CONTROL APPARATUS

Claude M. Hines, Pittsburgh, Pa., assignor to The Westinghouse Air Brake Company, Wilmerding, Pa., a corporation of Pennsylvania Application June 30, 1943, Serial No. 492,871

8 Claims. (Cl. 60—97)

This invention relates to control apparatus and more particularly to a propulsion system embodying a plurality of prime movers such as of the Diesel type.

In certain ships a plurality of reversible Diesel engines are used for driving a ship's propeller, these engines being connected to the propeller through individual clutches. In order to obtain a relatively high degree of maneuverability of the ship, it is desirable that the engines be operable either individually or in multiple, to turn the propeller in either one direction or in the opposite direction. Further, if the propeller is being driven by one engine operating in one direction, it is imperative to prevent another engine operating in the opposite direction being connected to the propeller at the same time.

One object of the invention is the provision of a multi-reversible-engine propulsion system providing for individual or multiple operation of the engines to drive a member such as a ship's propeller in either one direction or in the reverse direction, but so arranged as to prevent an engine operating in one direction being connected to the propeller while the propeller is being driven by another engine operating in the reverse direction.

Another object of the invention is the provision of such a system in which two engines operating in reverse directions may be individually connected to drive the propeller but so arranged as to prevent both engines being connected to the propeller at the same time.

Other objects and advantages will be apparent from the following more detailed description of the invention.

In the accompanying drawing.

Description

Figure 1:
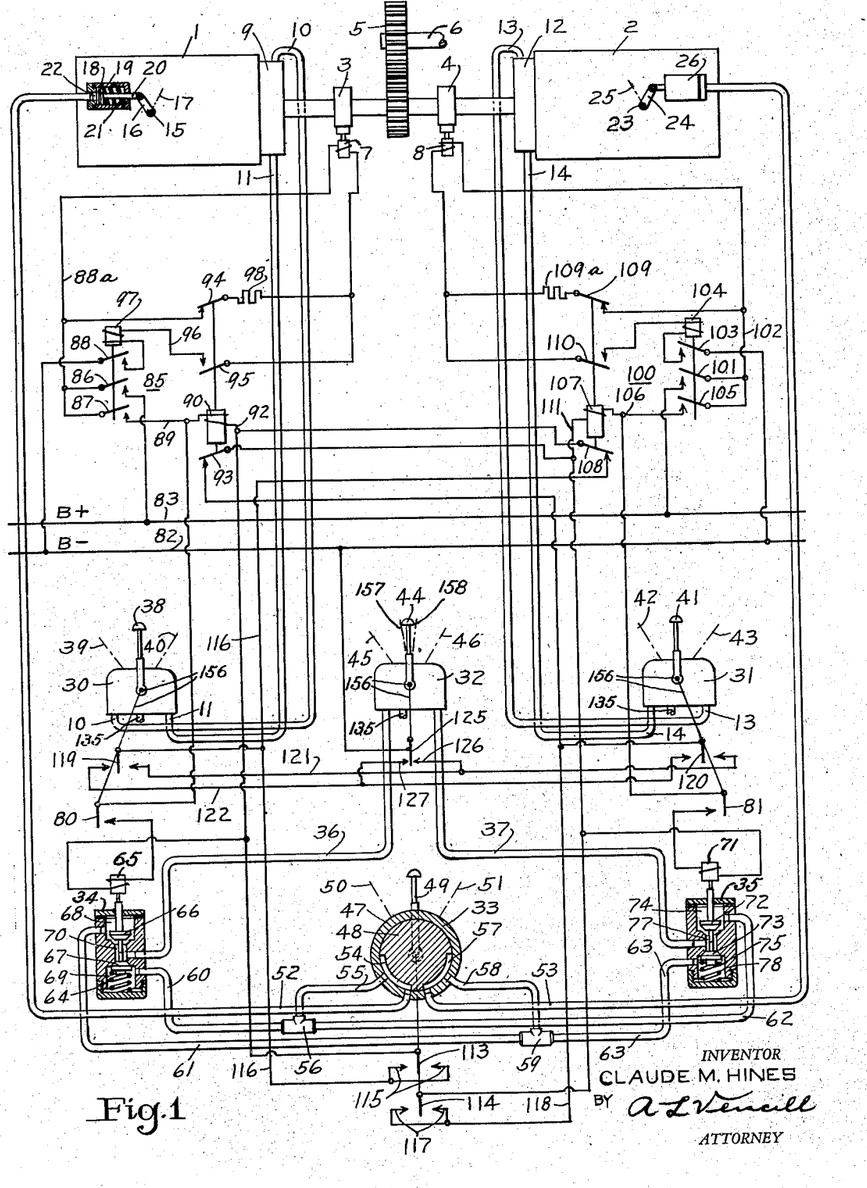
Fig. 1 is a diagrammatic view, with certain parts in section and other parts in outline, of a control system embodying the invention.

As shown in the drawing, the reference numerals 1 and 2 indicate two reversible engines, such as of the Diesel type, which are connected through couplings 3 and 4, respectively, and a reduction gear 5 to a shaft 6 which may be a ship's propeller shaft. The couplings 3 and 4 may be of any suitable type, and magnets 7 and 8 are provided for controlling the operation of the respective couplings. Energization of the magnets renders the couplings effective to connect the respective engines to the reduction gear, while deenergization of the magnets render the couplings ineffective, or disconnects the respective engines from the reduction gear.

The reference numeral 9 indicates a pneumatic power starting, reversing and stop control means for engine 1. This means is controlled through two pipes 10 and 11, which may be respectively called a forward pipe and a reverse pipe. Fluid under pressure supplied to the forward pipe 10 will cause operation of the control means 9 to effect starting and running of the engine 1 in, for instance, a direction to cause forward movement of the ship, while supply of fluid under pressure to pipe 11 will cause operation of the control means 9 to effect starting and running of the engine in the reverse direction. The provision of fluid at the same pressure in both pipes 10 and 11 will condition control means 9 to cause stopping of the engine.

The reference numeral 12 indicates a starting, reversing, and stop control means for engine 2. This means may be like the means 9 associated with engine 1 and operative in the same manner with respect to engine 2 upon supply of fluid under pressure to either a forward pipe 13, or a reverse pipe 14, or upon equalization of the fluid pressures in both of said pipes.

The engine 1 is provided with a shaft 15 which is rockable by a lever 16 for governing the fuel supply to the engine to cause operation thereof at a desired speed or output of power. The lever 16 may have an engine idling position in which it is shown in the drawing to cause operation of the engine at an idling speed and may be movable in a clockwise direction for increasing the speed of the engine. A dot and dash line 17 indicates a position which the lever 16 may assume to provide operation of the engine at maximum speed or power output.

Adjustment of the governor lever 16 may be controlled by a cylinder device 19 which comprises a piston 18 connected by a rod 20 to one end of said lever. A spring 21 encircling rod 20 bears against one side of piston 18 for urging same to the position shown in the drawing to move the lever 16 to its engine idling position. At the opposite side of piston 18 is a pressure chamber 22 for receiving fluid under pressure to act on said piston. Fluid under pressure supplied to chamber 22 will position the piston 18, against the opposing power of spring 21, in accordance with the pressure of such fluid and thus correspondingly position the lever 16, whereby the speed or power output of the engine may be varied in proportion to such pressure. It will thus be seen that any desired speed or power output of the engine may be attained by the provision in chamber 22 of fluid at a chosen degree of pressure.

The engine 2 has a governor shaft 23 which is adjustable by a lever 24 for controlling the speed or power output of said engine. The lever 24 may have an engine idling position in which it is shown and may be movable in a counterclockwise direction for increasing the speed or power output of the engine. A dot and dash line 25 indicates a position which the lever 24 may assume to provide maximum speed or power output of engine 2. The lever 24 may be adjusted pneumatically by a cylinder device 26 like the cylinder device 19.

Structures such as above described are so well known that no further description thereof is required in the present application for a clear understanding of the invention. It is desired, however, to point out that the cylinder devices 19 and 26 provide for individual control of the speed or power output of engines 1 and 2, respectively; the starting, reversing, and stop control means 9 and 12 provide for individual starting of said engines in either direction, and the couplings 3 and 4 provide for individual connecting and disconnecting of the engines to and from the propeller shaft 6, whereby either or both of the engines may be caused to operate in either and the same direction and be connected to drive the propeller shaft 6, or said shaft may be driven in either one direction or in the reverse direction by either individual engine.

According to the invention, there are provided individual manually operative starting, reversing, and stop control devices 30 and 31 for controlling operation of the power starting, reversing, and stop control means 9 and 12 of engines 1 and 2 respectively, a single speed control device 32 for controlling operation of the cylinder devices 19 and 26 at both engines, a selector device 33, and interlock devices 34 and 35 which are cooperative with the selector device 33 and the speed control device 32 to provide for control of the speed of the two engines either individually or in unison. Means for controlling the couplings 3 and 4 are also provided as will be later brought out.

Figure 2:
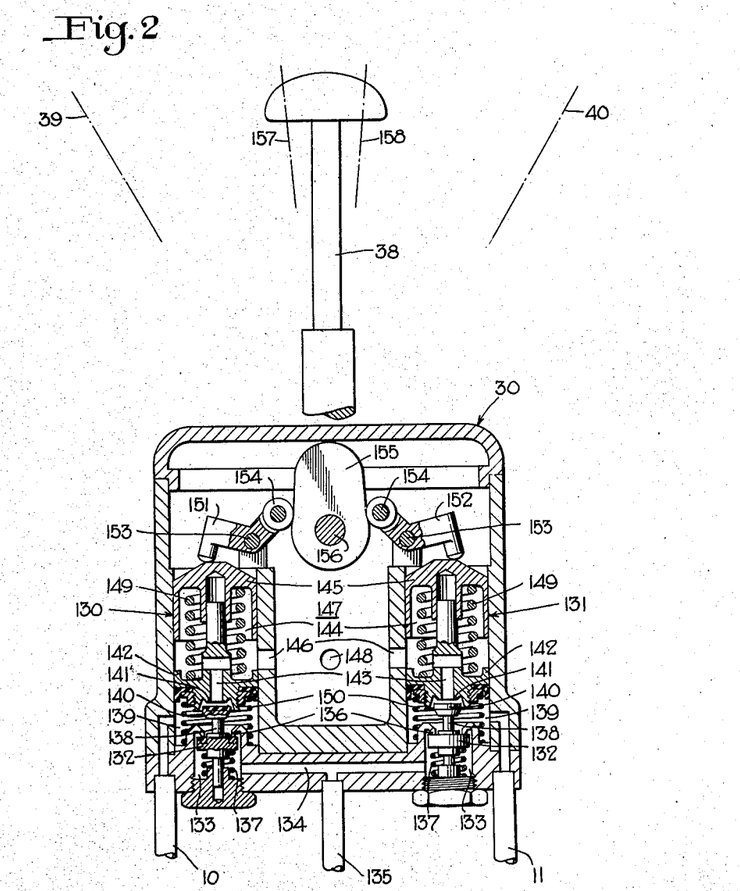
Fig. 2 is a sectional view of an operator's control device several of which are shown in elevation in Fig. 1.

The control device 30 may comprise a casing containing two fluid pressure supply and release valve devices 130 and 131 each of which comprises a fluid pressure supply valve 132 contained in a chamber 133 which is open by a passage 134 to a fluid pressure supply pipe 135. The casing has an annular seat 136 for engagement by the valve 132 and a spring 137 contained in chamber 133 acts on said valve for urging it towards said seat. The valve 132 is provided with a stem 138 freely extending axially through the seat 136 into a chamber 139 wherein a release valve 140 on the end of said stem is provided for cooperation with a seat 141 formed on one end of a piston 142 which is slidably mounted in the casing and forms one end of said chamber. The release valve seat 141 encircles a fluid pressure release passage 143 which opens to a chamber 144 formed between piston 142 and a plunger 145 also slidably mounted in the casing in coaxial relation with said piston and the valves 140 and 132. Chamber 144 is open through a passage 146 to chamber 147 which is in constant communication with atmosphere through a passage 148. A control spring 149 contained in chamber 144 has one end bearing against piston 142 while the opposite end bears against plunger 145 and said spring is at substantially its free height with said plunger in the position in which it is shown in the drawing. A bias spring 150 contained in chamber 139 and having one end supported by the casing bears against piston 142 for urging same out of seating engagement with the release valve 140. The pipes 10 and 11 are connected to the release valve chambers 139 in, respectively, the valve devices 130 and 131.

The two valve devices 130 and 131 are arranged in spaced parallel relation and the ends of the two plungers 145, opposite the respective chambers 144, are engaged by the outer ends of two oppositely arranged bell cranks 151 and 152 which are fulcrumed on pins 153 in the casing. A roller 154 is secured in each of the adjacent or innner ends of the bell cranks 151 and 152, and the two rollers 154 engage oppositely arranged but like surfaces of a cam 155 which is secured to turn with a rock shaft 156. An operator's control lever 38, disposed outside of the casing, is connected to the shaft 156 for rocking same.

With the operator's control lever 38 in a neutral or stop position, in which it is shown in the drawing, the cam 155 and bell cranks 151 and 152 may permit movement of the parts of the valve devices 130 and 131 to the position in which they are shown in the drawing under the pressure of the respective springs 149, 150 and 137, in which position the supply valves 132 are closed or seated on seats 136 and the release valves 140 are unseated from seats 141, so that pipes 10 and 11 are both open to atmosphere whereby the starting, reversing and stop control means 9 associated with engine 1 will cause stopping of the engine.

The lever 38 is movable from its neutral position to a forward position indicated by a dot and dash line 39. Upon such movement the cam 155 will actuate bell crank 151 to move the plunger 145 in the valve device 130 downward in the direction of piston 142, while the bell crank 152 and thereby the parts of the valve device 131 will remain in the position in which they are shown in the drawing to maintain the pipe 11 open to atmosphere.

In the valve device 130, the plunger 145 as it moves downward as just described, will, through the medium of spring 149, shift the piston 142 also downwardly and during such movement the valve seat 141 on said piston will engage the release valve 140 in a position of lever 38 such as indicated by a dot and dash line 157. Further downward movement of plunger 145 and piston 142 will then move the release valve 140 and supply valve 132 therewith, resulting in unseating of said supply valve, whereupon fluid under pressure from the supply pipe 135 will flow past said supply valve to chamber 139 and thence to pipe 10. The pressure of fluid thus obtained in chamber 139 opposes spring 149 on the piston 142 and when such pressure becomes sufficient to overcome said spring, the piston 142 will move against said spring and permit movement of the supply valve 132 by spring 137 in the direction of its seat 136. As the piston 142 thus moves against spring 149 the pressure of said spring will increase, and the characteristics of the spring may be such, with the lever 38 in the forward position indicated by the dot and dash line 39, as to prevent sufficient movement of piston 142 by pressure of fluid from the supply pipe 135 to permit closing of the supply valve 132 by spring 137, or the supply valve 132 may seat before the pressure of fluid in chamber 139 and pipe 10 increases to the same degree as in the supply pipe 135. This is immaterial, for the pressure of fluid obtained in pipe 10 with the operator's control lever 38 in its forward position 39 will, with pipe 11 open to atmosphere, effect operation of the starting, reversing and stop control means 9 to cause starting and running of engine 1 in a direction for driving shaft 6 to cause, for instance, forward movement of a ship.

The lever 38 is also movable to the opposite side of neutral position to a reverse position, indicated by a dot and dash line 40, for actuating the valve device 131, to supply fluid under pressure to pipe 11 in the same manner as the valve device 130 was operated to supply fluid under pressure to pipe 10. When the lever is moved from the forward position 39 back to neutral position, the plunger 145 in the valve device 130 will be returned to the position, in which it is shown in the drawing, by the pressure of spring 149 which will expand and reduce its force on piston 142, whereupon spring 150 plus pressure of fluid in chamber 139 will return piston 142 to the position also shown in the drawing to permit closing of the supply valve 132 and unseating of the release valve 140 so as to release fluid under pressure from pipe 10. With fluid under pressure released from pipe 10 and supplied to pipe 11, as just described, the starting, reversing and stop control means 9 will cause starting and running of engine 1 in the opposite direction. Return of lever 38 to its neutral position from either its forward or reverse position will open both pipes 10 and 11 to atmosphere to cause operation of the starting, reversing and stop control means 9 to stop the engine 1.

The control device 31 is identical to the control device 30 and is provided for controlling supply and release of fluid under pressure to and from pipes 13 and 14, and comprises an operator's control lever 41, corresponding to lever 38 of the control device. The lever 41 has a neutral or stop position, a forward position indicated by a dot and dash line 42 and a reverse position indicated by a dot and dash line 43, for effecting operation of the starting, reversing and stop control means 12 to cause engine 2 to start and run in either a forward direction, a reverse direction or for stopping said engine.

It will now be seen that by operation of the independently operative control devices 30 and 31 the engines 1 and 2 may be caused to operate in either and the same effective direction or in relatively reverse directions.

The control device 32 is provided for controlling pressure of fluid in a forward speed control pipe 36 and a reverse speed control pipe 37 and may be identical to the control device 30 above described, the numeral 44 being employed to designate the operator's control lever for the control device 32, but said lever corresponds to lever 38 of the control device 30.

Lever 44 of the control device 32 has a neutral position for causing operation of said device to open both pipes 36 and 37 to atmosphere and is movable out of said position in the direction of a maximum forward pressure position, indicated by a dot and dash line 45, to provide fluid in pipe 36 at a pressure corresponding to the extent of such movement, as will be presently described, while opening pipe 37 to atmosphere. Movement of lever 44 in the opposite direction from neutral position to a maximum reverse pressure position, indicated by a dot and dash line 46, will cause operation of the valve device 32 to supply fluid to pipe 37 at a pressure corresponding to the extent of such movement, while maintaining pipe 36 open to atmosphere.

Let it be assumed that lever 44 is moved out of neutral position to a position say midway between neutral and the maximum forward pressure position 45. This will cause a corresponding downward displacement of plunger 145 in the respective valve device 130 which will cause opening of the supply valve 132 therein to supply fluid under pressure to pipe 36. When the pressure of fluid thus supplied to pipe 36 and acting in chamber 139 on piston 142 becomes increased sufficiently, it will move said piston against spring 149 to permit movement of the supply valve 132 toward its seat, and said supply valve will finally contact its seat and prevent further flow of fluid under pressure to pipe 36 when the pressure therein and in chamber 139 becomes increased to a degree corresponding to the position of plunger 145 and hence corresponding to the position of the operator's control lever 44 out of its neutral position.

If now the lever 44 is moved further in the direction of the maximum forward pressure position 45, the plunger 142 will be moved downward a correspondingly greater degree to again unseat the supply valve 132. Fluid under pressure will then again flow from the supply pipe 135 to pipe 36 until the pressure in said pipe is increased sufficiently for actuating piston 142 to permit closing of the supply valve 132 for again limiting the pressure obtained in said pipe to a degree corresponding to the position of lever 44. A maximum pressure of fluid will be obtained in pipe 36 when the lever 44 is in the maximum forward pressure position 45.

Now assuming that it is desired to reduce the pressure in pipe 36 to a degree still in excess of the minimum pressure, which may be atmospheric, the lever 44 is moved back toward neutral position to a new chosen position. In the valve device 130 the plunger 145 will be moved upwardly with lever 44 by spring 149 and assume a correspondingly new position, as a result of which, the pressure of spring 149 on piston 142 will be reduced. Pressure of fluid in chamber 139 will, as a result, move piston 142 away from the release valve 140 whereupon fluid under pressure will be released from said chamber and pipe 36. As the pressure of fluid in chamber 139 and pipe 36 is thus reduced spring 149 will move piston 142 back toward and finally against the release valve 140 to prevent further release of fluid under pressure from said chamber and pipe, thereby limiting the pressure of fluid in said pipe to a degree corresponding to the position of lever 44. If the lever is moved further toward neutral position the pressure of fluid in pipe 36 will again be correspondingly reduced as will be evident from the above description.

When the lever is returned to the position indicated by the dot and dash line 157, the release valve 140 in the valve device 130 will become seated by spring 149, in the manner above described, when the pressure in pipe 36 and chamber 139 becomes reduced to substantially that of the atmosphere, while in neutral position of said lever the release valve will be held open by pressure of bias spring 150 on piston 142, as above described.

It will now be seen that in neutral position, and in the position of lever 44 designated by the dot and dash line 157, the pressure in pipe 36 will be atmosphere pressure, while a maximum pressure will be provided in said pipe in the position indicated by the dot and dash line 45, and for any intermediate position of said lever the pressure in said pipe will be of an intermediate degree proportional to the distance said lever is out of neutral position. It will be further noted that under the condition just described the pipe 37 will be vented.

In a manner which will be apparent from the above description, the pipe 36 may be vented and any selected pressure of fluid between a minimum and maximum may be provided in pipe 37 by properly adjusting the lever 44 between neutral position and the maximum pressure reverse position indicated by the dot and dash line 46. The dot and dash line 158 at this side of neutral position designates the position of lever 44 in which the piston 142 in the valve device 131 will just seat against the respective release valve 140 upon movement of lever away from neutral position toward the maximum pressure position 46.

Movement of lever 44 in the direction of the dot and dash line 45 as described above is intended for use in controlling the speed of the engines 1 and/or 2, in a manner which will be later described, when the engines are operating in a direction to cause forward movement of the ship, while movement in the opposite direction is intended for use when the engines are operating in the opposite direction.

The selector device 33 comprises a casing 47 containing a rotary valve 48, and an operating lever 49 connected to said valve for turning same to either one of three positions. The lever 49 has an individual control position in which it is shown, and is rockable therefrom in a counterclockwise direction to a multiple control position for forward movement of the ship, which position is indicated by a dot and dash line 50. The lever 44 is also movable in the opposite direction from the individual position shown in the drawing to a multiple control position for astern movement of the ship, which position is indicated by a dot and dash line 51.

The speed control cylinder device 19 associated with engine 1 is connected by a pipe 52 to the peripheral surface of the rotary valve 48, while the cylinder device 26 associated with engine 2 is connected by a pipe 53 also to the peripheral face of the rotary valve 48. In the individual control position of the selector valve lever 49 a cavity 54 in the rotary valve establishes communication between pipe 52 and a pipe 55 leading to the side outlet of a conventional type double check valve device 56, while another cavity 57 in said valve establishes communication between pipe 53 and a pipe 58 leading to the side outlet of another double check valve device 59 which may be like the double check valve device 56. In the position of lever 49 indicated by the dash and dot line 50 the cavity 54 in the rotary valve 48 is arranged to connect pipe 55 to both pipes 52 and 53 and to isolate the connection with pipe 58, while in the position indicated by the dot and dash line 51 cavity 57 in said valve will connect pipes 52 and 53 to pipe 58 and isolate pipe 55.

One end of the double check valve device 56 is connected to a pipe 60, and one end of the double check valve device 59 is connected to a pipe 61, which pipes lead to the interlock device 34. The other ends of the double check valve devices 56 and 59 are connected by pipes 62 and 63, respectively, to the interlock device 35.

The interlock device 34 comprises a magnet 65 and two oppositely seating axially aligned poppet valves 66 and 67 arranged for control by said magnet. The valves 66 and 67 are contained in chambers 68 and 69 to which pipes 61 and 60, respectively, are connected. The valve 66 is provided for controlling communication between chamber 68 and a chamber 70, while the valve 67 is provided for controlling communication between chamber 69 and chamber 70, the chamber 70 being open to pipe 36 leading to the speed control device 32. When the magnet 65 is energized it is operative to close valve 66 and open valve 67. A spring 64 acting on the valve 67 is provided for seating same and opening the valve 66 upon deenergization of magnet 65.

The interlock device 35 may be identical to the interlock device 34 and therefore comprises a magnet 71 and two oppositely seating poppet valves 72 and 73 contained in chambers 74 and 75 which are connected to pipes 62 and 63, respectively. The valve 72 is arranged to control communication between chamber 74 and a chamber 77 while valve 73 is provided to control communication between chamber 75 and chamber 77. Chamber 77 is open to pipe 37 leading to the speed control device 32. Energization of magnet 71 is arranged to close valve 72 and open valve 73, while upon deenergization of said magnet a spring 78 acting on valve 73 will act to close valve 73 and open the valve 72.

Magnet 65 has one terminal arranged to be connected by switches to be later described to one side of a source of electric current, such as a B− wire 82, while the other terminal is arranged to be connected to the other side of said source of electric current or a B+ wire 83, the circuit between said B+ wire and magnet being controlled by a normally closed switch, which will be later described, and a switch 80 controlled by lever 38 of the starting, reversing, and stop control device 30. With lever 38 in the neutral position and in the reverse starting position indicated by the dot and dash line 40, the switch 80 will be open, while when said lever is in the forward starting position indicated by the dot and dash line 39 said switch will be closed. Thus the magnet 65 can be energized only when the lever 38 is in its forward position.

One terminal of magnet 71 is also connected to the B− wire 82 through switches to be later described, while the other terminal is connected to B+ wire 83 through a normally closed switch which also will be later described, and by way of a switch 81 controlled by lever 41 of the starting, stopping, and reversing control device 31. With lever 41 in its neutral position and in its forward starting position indicated by the dot and dash line 42, the switch 81 will be open, while with said lever in the reverse starting position indicated by the dot and dash line 43 said switch will be closed. The magnet 71 can, therefore, be energized only with lever 41 in its reverse position.

If it is desired to propel the ship forwardly under the power of both engines 1 and 2, the levers 38 and 41 of the two starting and reversing control devices 30 and 31 are moved to their forward positions indicated by the dot and dash lines 39 and 42, respectively, to thereby effect starting of said engines in the same direction. This operation of lever 38 closes switch 80 to energize magnet 65 for closing valve 66 and opening valve 67, so as to connect the forward speed control pipe 36 to pipe 60. The selector lever 49 will be moved to its multiple forward control position indicated by dot and dash line 50 so that cavity 54 therein will connect pipe 55 to both pipes 52 and 53 whereby movement of lever 44 of the speed control device 32 from its neutral position in a forward direction toward the dot and dash line 45 will control the pressure of fluid in both of the speed control cylinder devices 19 and 26 for thereby controlling the speed or power output of the two engines in unison.

If it is desired to propel the ship in an astern direction under the power of both engines, the starting control levers 38 and 41 will be moved to their reverse starting positions indicated by the lines 40 and 43. The switch 81 will thereby be closed to effect energization of magnet 71 and consequent closing of valve 72 and opening of valve 73 for connecting the reverse speed control pipe 37 to pipe 63. Lever 49 of the selector device 33 will be moved to its reverse multiple control position indicated by the dot and dash line 51 for connecting pipe 58 to both of the pipes 52 and 53 whereby movement of the speed control lever 44 in a clockwise direction from its neutral position shown will cause operation of the two cylinder devices 19 and 26 in unison to effect simultaneous and like adjustments of the speed of both engines for propelling the ship in an astern direction.

The two engines may be started and run in opposite directions, if desired, under which condition the speed of either engine, but not of both, can be individually controlled through the selector valve device 33 which will be in its individual control position shown in the drawing.

Let it be assumed that the levers 38 and 41 are in their forward and reverse positions indicated by lines 39 and 43, respectively, for thereby causing the two engines to operate in reverse directions. Under this condition of levers 38 and 41, the two switches 80 and 81 will be closed and thereby the magnets 65 and 71 will be energized for connecting pipes 36 and 37 to pipes 60 and 63, respectively.

With the parts thus conditioned, if the operator desires to increase the speed or power output of engine 1 while the engine 2 is operating in the reverse direction at idling speed, he may move lever 44 in the direction of the left hand to supply fluid under pressure through pipe 36 past the magnet opened valve 67 and thence through the double check valve device 56, and pipes 55 and 52 to the cylinder device 19 for providing any desired increase in speed or power output thereof, while movement of said lever back toward neutral position will release fluid under pressure from the cylinder device 19 by way of pipe 36 to reduce the speed of the engine if such is desired. To accelerate engine 2 while engine 1 is operating at idling speed, the lever 44 may be moved to the right hand or reverse side of its neutral position for supplying fluid to pipe 37 from which it will flow past the magnet opened valve 73, through double check valve device 59, and pipes 58 and 53 to the cylinder device 26 associated with the engine.

On the other hand if lever 38 of the control device 30 is in its reverse position indicated by line 40 and lever 41 of the control device 31 is in its forward position indicated by line 42 both of the switches 80 and 81 will be open and the magnets 65 and 71 as a consequence deenergized. Under this condition movement of lever 44 toward the left-hand from its neutral position will supply fluid to the forward pipe 36 and thence past valve 66 in the magnet device 34 to pipe 61 from whence it will flow through the double check valve device 59 and pipe 58 to pipe 53 and thence to the cylinder device 26 associated with engine 2 to thereby accelerate said engine operating in a forward direction, while the engine 1 operating in the reverse direction remains at idling speed. If the lever 44 of the control device is moved toward the right-hand from its neutral position, fluid will be supplied to pipe 37 and thence through the magnet valve device 35, pipe 62, double check valve device 56 and pipes 55 and 52 to the cylinder device 19 associated with engine 1 whereby this engine operating in reverse may be accelerated to any desired degree while engine 2 operating in a forward direction will remain at idling speed.

From the above it will be seen that the two engines may be individually started and caused to run in either and the same direction, or in reverse directions, and the speed of the engines may be controlled either individually or in unison by operation of the speed control device 32 as determined by the position of the selector device 33.

The engines 1 and 2 are arranged to be connected and disconnected to and from the propeller shaft 6 by means of the couplings 3 and 4 which are controlled by magnets 7 and 8, as above described. When it is desired to drive the propeller shaft 6 by both engines 1 and 2 operating in either one direction or in the reverse direction, it is essential that both couplings 3 and 4 be operated to connect said engines to the reduction gear 5, but in case it is desired to drive the propeller shaft 6 by only one engine at a time, it is desirable that only the coupling 3 or 4 of the selected engine, be operated to connect that engine to drive the propeller shaft 6, while the other coupling be maintained in a condition preventing the coupling of the other engine to said propeller shaft. This control of the two couplings 3 and 4 is obtained through the medium of structure partly associated with the control devices 30, 31, and 32, the selector device 33 and by other means which will now be described.

The structure for controlling magnet 7 of coupling 3 comprises a manually closable and openable three pole switch 85 which includes three movable contacts 86, 87, and 88. When the system is in operation, all of these contacts are closed, the contact 86 connecting B+ wire 83 to a wire 88a which is connected to one terminal of the coupling control magnet 7 and also to the movable contact 87. With movable contact 87 in its closed position electric current is supplied from wire 88a to a wire 89 leading to one terminal of a magnet 90 and to the switch 80 associated with the starting, reversing, and stop control device 30. The other terminal of magnet 90 is connected to a wire 92.

The magnet 90 is arranged to control two back contacts 93 and 94 and a front contact 95. The front contact 95 controls a circuit between the other terminal of the coupling magnet 7 and a wire 96 which extends through a protection device 97 to contact 88 of the three pole switch. The contact 88 is provided for normally closing the circuit between wire 96 and the B— wire 82 whereby upon closure of contact 95, magnet 7 will be energized to render coupling 3 effective to connect engine 1 to the propeller shaft 6. Opening of contact 95 will therefore effect deenergization of magnet 7 and operation of coupling 3 to disconnect engine 1 from the propeller shaft 6. The protection device 97 is provided for operating the switch contact 88 to open the circuit through the magnet 7 in case, for instance, of a short circuit in said magnet. The switch 94 is arranged in series with a resistance 98 across the two terminals of magnet 7 for dampening current surge upon opening of the magnet control contact 95.

A manually openable and closable three pole switch 100, like the switch 85, is associated with the control apparatus for coupling 4 of engine 2. This three pole switch has a contact 101 for connecting the B+ wire 83 to a wire 102 leading to one terminal of magnet 8; a contact 103 for controlling the energizing circuit of said magnet by way of a protection device 104, and a contact 105 for connecting wire 102 to a wire 106 which leads to switch 81 associated with the starting, reversing, and stop control device 31 for engine 2. The wire 106 also leads to a magnet 107 which, like the magnet 90, is arranged to control two back contacts 108 and 109, and one front contact 110. The front contact 110 is arranged in series with contact 103 of the three pole switch 100 to control the circuit through magnet 8. The contact 109 is arranged in series with a resistance 109a across the terminals of magnet 8 for dampening current surge upon opening of contact 110. The other terminal of magnet 107 is connected to a wire 111.

The selector device 33 is provided with two contacts 113 and 114 which are movable with lever 49. The contact 113 is connected to wire 92 leading to magnet 90, while contact 114 is connected to wire 111 leading to magnet 107. The movable contact 113 is arranged to cooperate with fixed contacts 115 in the forward and reverse multiple control positions of lever 49, indicated by lines 50 and 51, respectively, to connect wire 92 to a wire 116, this connection being broken with the lever 49 in its individual control position shown in the drawing. The movable contact 114 is arranged to cooperate with fixed contacts 117 in the forward and reverse multiple control positions of lever 49 to connect wire 111 to a wire 118, and to break such connection with said lever in its individual control position shown in the drawing.

The back contact 108 associated with magnet 107 is provided for controlling a connection between wire 92 and wire 116, while the back contact 93 associated with magnet 90 is provided for controlling a connection between wires 111 and 118.

The wire 116 is also connected to a movable contact 119 associated with the starting, reversing, and stop control device 30, while wire 118 is connected to a like movable contact 120 associated with the other starting, reversing, and stop control device 31. In the forward start position of control device 30 indicated by line 39 the movable contact 119 is arranged to connect wire 116 to a wire 121, while in the reverse start position of said lever said contact is arranged to connect wire 116 to a wire 122. The movable contact 120 associated with the control device 31 is operative with lever 41 thereof in its forward start position indicated by line 42 to connect wire 118 to wire 121, and in the reverse start position of said lever to connect wire 118 to wire 122. In the neutral positions of levers 38 and 41 the movable contacts 119 and 120 open the connection between wires 116 and 118, and wires 121 and 122, respectively.

A movable contact 125 is associated with the speed control device 32 for movement by lever 44. This contact is permanently connected to the B— wire 82 and upon slight forward movement of lever 44 out of idling or neutral position in the direction of the dot and dash line 45, is arranged to engage a fixed contact 126 connected to wire 121. Slight movement of lever 44 in the opposite or reverse direction from its neutral position will cause contact 125 to move into engagement with a fixed contact 127 connected to wire 122. The contact 125 is arranged to engage the contacts 126 or 127 in the positions 157 and 158, respectively, of lever 44 and hence before causing acceleration of either or both of the engines 1 and 2 upon movement of lever 44 in either one direction or the opposite direction from its neutral position, and to then maintain such contact during all further movement of the lever away from neutral position. Any suitable structure may be provided for accomplishing this end, but in the present embodiment, the movable contact 125 may be considered as sufficiently flexible to allow movement of the lever 44 in either direction to its full speed position indicated by either line 45 or line 46 after engagement with either contact 126 or contact 127.

As before mentioned the three pole switches 85 and 100 will both be closed normally, as when the ship is in use. With the switch 85 closed, electric current will be supplied from the B+ wire 83 through the switch contact 86 to wire 88a leading to one terminal of magnet 7 and through the switch 87 to wire 89 leading to one terminal of magnet 90 and to the switch 80 associated with the control device 30. Likewise, current from the B+ wire 83 will be supplied through contact 101 of the switch 100 to one terminal of the coupling magnet 8 and also through switch 105 to wire 106 leading to magnet 7 and to switch 81 associated with the control device 31.

Let it be assumed that the control levers of the control devices 30, 31, and 32 are in their neutral positions shown and that lever 49 of the selector device 33 is also in its neutral position shown. The wire 92 will then be connected through the back contact 108 associated with magnet 107 to the switch 119 associated with the control device 30 and also to the switch device 113 associated with the selector device 33, and since both of these switches are open, the magnet 90 will remain deenergized for opening the contact 95, so that the coupling magnet 7 will be deenergized for effecting operation of coupling 3 to disconnect engine 1 from the propeller shaft 5. Likewise the magnet 107 will be deenergized since the switch contact 114 is out of contact with movable contacts 117 and switch 120 associated with control device 31 is open. As a result, contact 110 controlled by magnet 107 will be in its open position effecting deenergization of magnet 8 and thereby operation of the coupling 4 to disconnect engine 2 from the propeller shaft 6. With the two engines thus disconnected from the propeller shaft 6 either may be independently started and run in one direction or in the reverse direction or both may be run in the same direction, if desired, in the manner before described.

Let it be assumed that it is desired to propel the ship forwardly under the power of both engines 1 and 2. To accomplish this, lever 38 of the control device 30 is moved to its forward starting position indicated by line 39, and lever 41 of the control device 31 is moved to its forward starting position indicated by line 42 to thereby start the engines in their forward direction. In this position of the control lever 38 contact 119 connects wire 116 to wire 121, while contact 120, associated with the control device 31, connects wire 118 also to wire 121. Lever 49 of the selector device 33 is also moved to its forward multiple control position indicated by line 50 and in which the contacts 113 and 114 connect wires 92 and 111 from the magnets 90 and 107 to wires 116 and 118, respectively. It will be noted that the two magnets 90 and 107 are still deenergized so that the couplings 3 and 4 are still in condition disconnecting the engines 1 and 2 from the propeller shaft 6.

With the apparatus conditioned as above described, the operator may now move lever 44 in the direction of line 45 for causing acceleration of both of the engines 1 and 2 in unison to a desired degree as above described. As the lever 44 is thus moved, contact 125 is shifted into contact with finger 126 connected to wire 121 before accelerating the engines, and this simultaneously closes the circuits through both of the magnets 90 and 107. These magnets are thus energized and operate to close the front contacts 95 and 110 respectively, to thereby effect energization of magnets 7 and 8 and consequent operation of both couplings 3 and 4 to connect engines 1 and 2 to the propeller shaft. It will thus be seen that movement of lever 44 out of its neutral position will first effect operation of the two couplings to connect the engines to the propeller shaft and then further movement of said lever will cause operation of said engines in unison at any desired degree of speed or power output.

The back contacts 93 and 108 of magnets 90 and 107 are opened upon energization of said magnets, as just described, but this is of no consequence in the multiple operation since the circuits controlled by said contacts under a different condition to be later described, are, under the present operation, both closed by the movable contacts 113 and 144 associated with the selector device 33.

If it is desired to employ the power of both engines 1 and 2 for driving the ship in an astern direction, lever 49 of the selector device 33 is moved to its reverse multiple control position indicated by line 51 and levers 38 and 41 of the two control devices 30 and 31 are moved to their reverse start position indicated by lines 40 and 43, respectively. In these positions of levers 38 and 41 the movable contacts 119 and 120 operated thereby connect wires 116 and 118, respectively, to wire 122 so that upon movement of the speed control lever 44 in the direction of line 46 and consequent movement of contact 125 into engagement with contact 127, the circuits through coupling magnets 7 and 8 will be closed and both couplings 3 and 4 will therefore be operated in unison to connect the two engines to the propeller shaft 6 and then said engines may be accelerated to the desired speed by further movement of lever 44.

Now let it be assumed that it is desired to employ engine 1 for moving the ship in a forwardly direction and at the same time have engine 2 running in the reverse direction in readiness for connection with the propeller shaft to move the ship in an astern direction whereby either engine may be connected to the propeller shaft individually for obtaining rapid reversal of movement of the ship, if such is desired.

To accomplish this, control lever 38 of the control device 30 is moved to its forward position indicated by line 39 for starting the engine 1 to turn in a direction for driving the ship forwardly. Lever 41 of the control device 31 is moved to its astern position indicated by line 43 for starting engine 2 in the reverse direction. The selector device 33 is moved to its individual control position as shown in the drawing and in which the circuits controlled by movable contacts 113 and 114 associated with said device are opened. With lever 38 of the control device 30 in its forward position, contact 119 connects wire 116 to the forward wire 121, while with lever 41 of the control device 31 in its reverse position contact 120 associated therewith connects wire 118 to the reverse wire 122.

To now attain forward movement of the ship, lever 44 of the speed control device is moved out of its neutral position in the direction of line 45 and this moves contact 125 into engagement with contact 126 for thereby closing the circuit through the magnet 90 by way of back contact 108 associated with magnet 107, it being noted that magnet 107 remains deenergized under this condition due to the circuit through said magnet being opened by contact 114 associated with the selector device 33 the lever 49 of which is in its neutral or individual control position, and said circuit is also open at contact 120 associated with the control device 31. This energization of magnet 90 upon movement of lever 44 closes the front contact 95 for effecting energization of magnet 7 and thereby operation of coupling 3 to connect the engine 1 to the propeller shaft 6 following which the engine 1 may be accelerated by lever 44 as previously described. The circuit of magnet 8 controlling coupling 4 is at this time open since magnet 107 is deenergized as just described so that the engine 2 is disconnected from the propeller shaft 6, but may operate at idling speed in the direction the reverse of operation of engine 1.

If it is desired to disconnect engine 1 from the propeller shaft 6 and connect the reversely operating engine 2 to said shaft for reversing the direction of movement of the ship, the lever 44 of the speed control device 32 may be moved back to its neutral position which reduces the speed of engine 1 to idling and then said lever is moved to the opposite side of neutral position in the direction of line 46. This movement of lever 44 first breaks the circuit through magnet 90 at contact 125 and then said contact engages the contact 127. The deenergization of magnet 90 opens contact 95 to effect deenergization of magnet 7 and operation of coupling 3 to disconnect engine 1 from the propeller shaft. Deenergization of magnet 90 also effects closure of the back contact 93, so that upon movement of contact 125 into engagement with contact 127 the circuit through magnet 107 is closed by way of contact 120 associated with the control device 31. The consequent energization of magnet 107 operates front contact 110 to close the circuit through magnet 8 so as to effect operation of coupling 4 to connect engine 2 to the propeller shaft 6. Thus the propeller shaft 6 is disconnected from engine 1 and connected only to the reversely operating engine 2 which may then be accelerated to a desired degree by operation of the speed control lever 44 to cause movement of the ship in the reverse direction, while the engine 1 continues to operate in its forward direction at idling speed.

It will now be seen that lever 44 may be moved to either one side or the other of its neutral position for connecting either of the two reversely operating engines to the propeller shaft 6 in order to obtain rapid reversal in direction of movement of the ship, but both engines cannot be connected to the propeller at the same time since with the selector lever 49 in its individual control position, the open contacts 113 and 114 prevent energization of both magnets 90 and 107 and thereby coupling magnets 7 and 8 at the same time.

With the selector device 33 in its individual engine position shown in the drawing providing for individual control of the speed of the engines and of the couplings 3 and 4, either engine may be employed to drive the ship either forwardly or astern with the other engine stopped, but the other engine, even if subsequently started, cannot at the same time be connected to the propeller shaft 6 without turning the selector device 33 to the proper multi-control position, as will now be described.

Assume that the selector lever 49 is in its individual control position shown in the drawing, that lever 38 of the control device 30 is in its forward position indicated by line 39 for causing running of engine 1 in a forward direction and that lever 44 is at the left hand side of neutral position effecting energization of magnets 90 and 7 and thereby operation of coupling 3 to connect engine 1 to the shaft 6 and to also cause operation of said engine at a desired speed. With the magnet 90 energized and the back contact 93 consequently opened, if lever 41 of the control device 31 is moved to its forward starting position for causing starting of the engine 2 in the same direction as the engine 1 is operating, the magnet 107 cannot be energized and the coupling 4 cannot therefore be caused to oprate to connect engine 2 to the propeller shaft 6.

If the engine 1 is running in the reverse direction, switch 80 will be open causing deenergization of the interlock control device 34 and wire 116 will be connected to wire 122. With lever 44 of the speed control device 32 at the right hand side of its normal position the coupling 3 will connect engine 1 to the propeller shaft 6 and magnet 90 being energized will open the back contact 93 to prevent closing of the circuit through magnet 107 in case lever 41 of the control device 31 should be moved to its reverse position indicated by the line 43 for starting the engine 2 in the same direction as the engine 1 is operating. Thus the engine 2 may be started in the same reverse direction as engine 1 is operating, but opening of the back contact 93 prevents operation of the coupling 4 to connect engine 2 to the propeller shaft with the selector device 33 in its individual control position in which acceleration of engine 2 in unison with engine 1 is not provided for. Under the conditions just set forth in which the magnet 65 is deenergized the control of speed of engine 1 upon movement of lever 44 in the direction of line 46 is provided through pipe 37, the interlock device 35, the magnet 71 of which is deenergized at this time, pipe 62, double check valve device 56, pipe 55, cavity 54 in the selector device 48 and thence through pipe 52 as before described. The magnet 71 is deenergized at this time with the control lever 41 in its neutral position due to the magnet circuit being opened by switch 81 as previously described. This circuit is also controlled by back contact 93 so that under the operating condition being described, said circuit will be maintained open if lever 41 of the control device 31 should be moved to its reverse starting position indicated by the line 43 for starting the engine 1 in the same direction as the engine 1 is operating.

It will now be seen that when the ship is being driven either forwardly or astern under the power of engine 1 and at which time the selector lever 49 will be in its neutral position, the opening of contact 93 by magnet 90 prevents operation of coupling 4 to connect engine 2 to the propeller shaft 6 in case engine 2 should be subsequently started in the same direction and also maintains magnet 71 of the interlock device 35 deenergized in case the control device 31 is operated to start engine 2 in reverse so as to maintain open the communication between the reverse speed control pipe 37 and pipe 58 through which the speed of engine 1 is controlled by the control device 32.

In case it is desired to use only engine 2 for driving the ship said engine may be started by operation of lever 41 of the control device 31 in either the forward or reverse direction and the operation of lever 44 of the control device 32 to either its forward or reverse position, depending upon the direction in which the engine 2 is running will then cause energization of magnet 107 and operation of the coupling 4 to connect said engine to the propeller shaft 6. This energization of magnet 107 opens the back contact 108 so as to prevent engine 1 being connected to the propeller shaft with the control device 33 in its individual control position, in case engine 1 should be subsequently started in the same direction. The opening of contact 108 acts to maintain magnet 65 of the interlock device 34 deenergized in case lever 38 of the control device 30 is moved to its forward position for starting engine 1 in a forward direction, so that with engine 2 operating in the forward direction its speed may be controlled through pipes 36 and 61 and then through the double check valve device 59 and pipes 58 and 53.

It will thus be seen that while the ship is being driven by either one of the engines, the other engine may be started in either direction. In case the other engine is started in the direction reverse to that of the driving engine the propeller shaft 6 may be connected thereto by suitable operation of lever 44 which operation will disconnect the one engine, whereby relatively rapid maneuverability of the ship may be obtained in either direction in the manner above described.

In case, however, it is desired to connect the second engine to the propeller shaft to aid the other engine driving same, the said second engine may be started in the same direction and the selector valve lever 49 must then be moved to the multiple control position determined by the direction of operation of the engines. This operation of the selector valve device moves the contacts 113 and 114 into engagement with one or the other of contacts 115 and 117, as determined by the direction of movement of the ship, and such operation shunts the back contact 93 or 108 and closes the circuit through either magnet 90 or magnet 107, depending upon the engine which previously was not operating, whereby said magnet is energized to effect operation of the respective coupling 3 or 4 to connect that engine to the propeller shaft along with the other engine. Movement of the selector lever 49 to the multiple control position described also connects the speed control cylinder 19 or 26 of the engine being cut in to speed control pipe 36 or 37 whereby the speed of the engine being cut into use will be brought up to that of the other engine. In other words, this operation of the selector device 33 connects the engine, just started, to the propelling shaft and also connects same to the effective speed control pipe so as to cause same to operate in unison with the engine previously driving the shaft.

With both engines operating to drive the ship in either direction, either engine may be cut out at will. If, for instance, under such a condition it is desired to disconnect the engine 2 from the propeller shaft whereby the ship will continue to be driven only by engine 1, lever 41 of the control device 31 may be returned to its neutral or stop position and lever 49 of the selector device 33 may be returned to its individual control position in which it is shown. This operation of the selector lever 49 opens the electric circuits controlled thereby and the return of lever 41 to stop position also opens the circuit controlled by contact 120 which permits deenergization of magnet 107 and consequent operation of coupling 4 to disconnect engine 2 from the propeller shaft, and at the same time, the back contact 108 closes the circuit between magnet 90 and contact 119 associated with the control device 30 whereby the magnet 90 is maintained energized or promptly reenergized so as to maintain the engine 1 connected to the propeller shaft 6. This operation of magnet 90 however maintains or promptly reopens the back contact 93 so as to prevent engine 2 being again connected to the propeller shaft 6 while being driven by engine 1 with the selector device in its individual control position. The movement of the selector device to its individual control position also closes the speed control connection between the speed control device 32 and the speed control cylinder 26 associated with engine 2 but maintains the speed control connection between said control device and the engine 1. The engine 1 thus remains under control of the speed control device 32 while the engine 2 is cut out of such control.

If while the ship is being driven under the power of both engines in either direction it is desired to retain engine 2 for driving the ship and cut out engine 1, such cut out may be attained in a manner which will be evident from the above description by movement of lever 38 of the control device 30 back to its neutral or stop position and return of the selector valve lever 49 to its individual control position.

*Summary*

From the above description it will now be seen that I have provided a ship's propulsion control system embodying a plurality of reversible propulsion engines, only two being shown in the drawing by way of illustration, which provides for a maximum degree of maneuverability of a ship in either direction. The ship may be driven in either direction under the power of both engines or under the power of only one engine. If the ship is being driven by only one engine, the other may be connected to drive, if such is desired. The engines may be caused to operate in reverse directions and either connected to drive the ship but under such a condition both cannot be connected at the same time. The engines may be started in either direction and stopped at the will of the operator. The connecting of the engines to drive the ship and the control of the engine speed is governed by a single lever the operation of which is the same whether one engine or both are being employed. The position of the selector device determines the number of engines responsive to operation of the speed clutch control lever 44. The control system is relatively simple and provides a relatively high degree of flexibility of control and therefore of maneuverability of a ship.

Having now described my invention, what I claim as new and desire to secure by Letters Patent is:

1. In combination, two reversely operating prime movers; coupling mechanism arranged to transmit power from said prime movers; an operator's control lever having a neutral position and being selectively movable in either one direction or another from said neutral position; interlock mechanism controlled by said lever to control said coupling mechanism; said lever being operable upon movement in said one direction out of said neutral position to effect operation of said interlock mechanism to render said coupling mechanism effective to transmit power from one of said prime movers and ineffective to transmit power from the other prime mover, and said lever being operative upon movement in said other direction out of said neutral position to effect operation of said interlock mechanism to render said coupling mechanism effective to transmit power from said other prime mover and ineffective to transmit power from the said one prime mover; individual speed regulating mechanism for each prime mover having an idling position and being adjustable out of said idling position to increase the speed or output of the respective prime mover; and speed control means controlled by said lever to control the speed regulating mechanisms for both prime movers and operable upon movement of said lever in said one direction to effect adjustment of the speed regulating mechanism for said one prime mover out of said idling position and operable upon movement of said lever in said other direction to effect adjustment of the speed regulating mechanism for said other prime mover out of said idling position.

2. In combination; two prime movers; coupling means for each prime mover adapted to be rendered either effective or ineffective to transmit power from the prime mover; speed regulating means for each prime mover adjustable to regulate the power output thereof; an operator's control lever; and mechanism controlled by said lever to control both said coupling means and speed regulating means.

3. In combination; two reversible prime movers; individual coupling means for each prime mover adapted to be rendered either effective or ineffective to transmit power from the prime mover; speed regulating means for each prime mover adjustable to regulate the power output thereof; an operator's control lever; control mechanism operable by said lever to control said coupling means and speed regulating means for both of said prime movers; and selector mechanism comprising means operable to render said coupling means for both prime movers responsive in unison to the operation of said control mechanism and to also render said speed regulating means for both prime movers responsive in unison to the operation of said control mechanism, said selector mechanism also comprising means operable to render the coupling means for either prime mover effective and the speed regulating means for the last mentioned prime mover responsive to the operation of said control mechanism, and to at the same time render the other coupling means ineffective and the other speed regulating means nonresponsive to operation of said control mechanism.

4. In combination; two prime movers; an individual speed regulating means for each prime mover operable to vary the power output thereof; speed control means operable to control the operation of said speed regulating means for both prime movers; a lever for operating said speed control means; and selector mechanism comprising means operable to connect both of the speed regulating means to said control means for control in unison by said lever, said selector mechanism also comprising means operable to selectively disconnect either one of said speed regulating means from said control means to provide for individual control by said lever of the other speed regulating means.

5. In combination; two prime movers; a first control means operable to selectively effect starting and stopping of one of said prime movers; a second control means operable to selectively effect starting and stopping of the other prime mover; two speed regulating means, one for regulating the speed of each of said prime movers; two control conductors; a speed control means for controlling both of said speed regulating means; interlock mechanism adjustable, in response to operation of said first control means to effect starting of the respective prime mover, to connect said speed control means to one of said control conductors and adjustable in response to operation of said first control means to effect stopping of the respective prime mover, to connect said speed control means to the other of said control conductors; and selector means adjustable to one position to connect both of said speed regulating means to the first mentioned control conductor and adjustable to another position to connect the speed regulating means of said second prime mover to the second mentioned control conductor and to disconnect the other speed regulating means from said speed control means.

6. In combination; two reversible prime movers; coupling means for each prime mover adapted to be rendered either effective or ineffective to transmit power from the prime mover; two operator's control means, one for controlling the starting, stopping and reversing of each prime mover; speed regulating means for each prime mover operable to vary the power output thereof; an operator's control device for controlling said coupling means and speed regulating means; interlock structure associated with each of said control means and adjustable thereby in accordance with the direction of operation of the respective prime mover; and mechanism cooperative with the interlock structures associated with the two control means and also cooperative with said control device, said mechanism comprising means operable, when said control means are operated to effect starting of both of said prime movers in the same direction, to render said coupling means and speed regulating means on both prime movers respectively controllable in unison by said control device, said mechanism further comprising means operable when said control means are operated to effect the starting of said prime movers in directions reverse of each other to render said coupling means and speed regulating means on one prime mover responsive to operation of said control device and, on the other prime mover, nonresponsive to operation of said control device.

7. In combination; two prime movers; coupling means for each prime mover operative to transmit power therefrom; speed regulating means for each prime mover adjustable to effect operation of the respective prime mover at an idling speed and also at a speed in excess of idling speed; an operator's control means operable to adjust said speed regulating means on both prime movers; and interlock means operable by said operator's control means to selectively render said coupling means either effective or ineffective in unison, with said speed regulating means adjusted to effect operation of said prime movers at said idling speed.

8. A system for controlling the speed of a prime mover and the effectiveness of coupling means for transmitting power from said prime mover comprising in combination, speed regulating means adjustable to selectively effect operation of said speed control means to effect operation of said prime mover either at an idling speed or at a speed in excess of said idling speed; coupling control means operable to render said coupling means either effective or ineffective; an operator's control lever having a first position, a second position and being movable out of said second position in a direction away from said first position; speed control means operable by said lever in said first and second positions to adjust said speed regulating means to effect operation of said prime mover at said idling speed and operable by said lever upon movement thereof out of said second position in the direction away from said first position to adjust said speed regulating means to increase the speed of said prime mover above said idling speed; and mechanism operable by said lever in said first position to effect operation of said coupling control means to render said coupling means ineffective and operable in all other positions of said lever to effect operation of said coupling control means to render said coupling means effective.

CLAUDE M. HINES.

REFERENCES CITED

The following references are of record in the file of this patent:

UNITED STATES PATENTS

| Number | Name | Date |
| --- | --- | --- |
| 1,682,358 | Sperry | Aug. 28, 1928 |
| 2,288,173 | Wohanka | June 30, 1942 |
| 2,289,654 | Keel et al. | July 14, 1942 |
| 2,408,098 | Schon | Sept. 24, 1946 |